United States Patent [19]
Burreson

[11] Patent Number: 5,331,277
[45] Date of Patent: Jul. 19, 1994

[54] INDUCTIVE DIVIDER POSITION SENSOR WITH FIXED AND VARIABLE IMPEDANCE INDUCTORS

[75] Inventor: Bernard J. Burreson, Seattle, Wash.

[73] Assignee: Eldec Corporation, Lynnwood, Wash.

[21] Appl. No.: 926,838

[22] Filed: Aug. 7, 1992

[51] Int. Cl.$^5$ ............................................... G01B 7/14
[52] U.S. Cl. ............................ 324/207.16; 324/207.12; 324/207.24
[58] Field of Search ...................... 324/207.12, 207.16, 324/207.17, 207.18, 207.19, 207.24; 340/870.31, 870.32, 870.33

[56] References Cited

U.S. PATENT DOCUMENTS

| | | | |
|---|---|---|---|
| 2,452,156 | 10/1948 | Schover | 324/207.16 X |
| 3,891,918 | 6/1975 | Ellis | 324/207.16 |
| 4,667,158 | 5/1987 | Redlich | 324/207 |
| 4,845,429 | 7/1989 | Burreson | 324/234 |
| 4,926,123 | 5/1990 | Redlich | 324/208 |
| 4,950,986 | 8/1990 | Guerrero | 324/207.19 |
| 5,010,298 | 4/1991 | Uemura | 324/207.19 |

FOREIGN PATENT DOCUMENTS

| | | | |
|---|---|---|---|
| 0074603 | 5/1982 | Japan | 324/207.16 |
| 2115929B | 11/1985 | United Kingdom | 324/207.16 |
| 86/07144 | 12/1986 | World Int. Prop. O. | 324/207.16 |

*Primary Examiner*—Gerard R. Strecker
*Attorney, Agent, or Firm*—Christensen, O'Connor, Johnson & Kindness

[57] ABSTRACT

Disclosed is an inductive divider sensor that comprises a variable inductor (12) connected in series with a fixed inductor (16) between a source of AC voltage and ground. A target element (18) is moved by an object whose position is to be sensed along an axis that extends through the variable inductor thereby changing its impedance. The impedance of the variable inductor is designed to vary such that the voltage taken at a node where the variable inductor and fixed inductor are connected varies according to a predetermined linear output signal.

16 Claims, 4 Drawing Sheets

INDUCTIVE DIVIDER POSITION SENSOR WITH FIXED AND VARIABLE IMPEDANCE INDUCTORS

FIELD OF THE INVENTION

The present invention relates to position sensors in general and, in particular, to inductive position sensors.

BACKGROUND OF THE INVENTION

Due to their strength and high reliability, inductive position sensors are often used in industry and aircraft to determine the position of an object. A typical inductive position sensor comprises a single coil of wire wound on a nonmagnetic bobbin. A target element is moved along an axis that extends through the coil by an object whose position is to be sensed. As the position of the target element changes, the inductance of the coil changes. An appropriate electronic circuit can measure the change in inductance to produce an indication of the position of the object.

Because inductive sensors are often used in environments that are subject to wide temperature variations, they need to be compensated for variations in the resistance of the wire that makes up the coils that occur with changes in temperature. This varying resistance can act to produce inaccurate indications of position unless the coil is compensated. Typically, temperature compensation is provided by having two coaxial coils that are configured to produce a differential signal as the target element is moved. For example, one common inductive sensor design consists of two coils connected end to end along a common axis. As the position of the object changes, the target element moves between the coils, thereby producing a differential output signal by increasing the inductance of one coil and decreasing the inductance of the other. This sensor configuration is compensated for temperature-provided the resistance of the two coils varies in the same way with changes in temperature. The problem with this design is that the length of the sensor is twice as long as the stroke of the target element. This extra length prohibits use of the sensor where space restrictions are critical. Additionally, the length of the sensor reduces its strength, rendering this particular sensor design unusable in areas of high stress.

A variation of the inductive sensor design described above is a sensor having two nested coils. Each coil of the sensor has a conical shaped winding. The two coils produce a differential signal as the target element is moved within the coils. While this design reduces the length of the sensor, the complexity of the coil design makes this sensor design impractical. Also, this sensor can only be operated at relatively low frequencies due to the inherent capacitance of the large number of windings that comprise the overlapping coils.

A third inductive sensor configuration that provides good temperature compensation is the so-called inductive divider sensor. This configuration includes two coils connected in series between a source of AC voltage and a reference potential such as ground. One of the coils has an inductance that varies as a target element is passed through the center of the coil. The output voltage of the sensor taken at a node where the two coils are joined varies with the position of the object. If both coils are constructed of similar materials and are exposed to the same environmental conditions, the resistance of both coils should change equally. Thus the output voltage of the sensor will not be affected by variations in temperature.

While inductive divider sensors provide good compensation for temperature, they have not previously been used to accurately measure the position of an object. This is because it has been impossible to make the sensor produce an output voltage that varies linearly with the position of the object. Therefore such sensors have been used as proximity sensors that determine whether an object is "near" or "far" away from a reference point. However, proximity sensors have not been able to accurately measure how near or far away an object is from a reference point. One example of an induction divider proximity sensor is the commonly assigned U.S. Pat. No. 4,845,429, issued to Burreson.

In light of the problems of prior art inductive sensors, a need exists for a new type of inductive divider position sensor. The sensor should be small and capable of producing a linear output signal as the position of the object changes as well as relatively insensitive to changes in environmental conditions.

SUMMARY OF THE INVENTION

To solve the problems associated with prior art inductive sensor designs, the present invention comprises an inductive divider sensor. The sensor includes two inductors connected in series between a source of a voltage source and ground or some other reference potential. The two inductors comprise a fixed inductor, having a fixed inductance, connected in series with a variable inductor that has an inductance that varies with a position of a target element. The target element is coupled to an object whose position is to be sensed so that as the object moves, the target element is moved along an axis that extends through the variable inductor. As the target element is moved by the object, an output signal indicative of the position of the object is produced at a node where the fixed and the variable inductors are connected.

The variable inductor is designed to have an inductance that varies as the position of the target element is changed, so that the output signal taken at the node between the fixed and the variable inductor will vary according to a desired predefined output signal. Specifically, by designing the variable inductor so that its inductance varies as a function of the desired predefined output signal, the output signal of the inductive divider sensor can be made to vary linearly with the position of the object.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
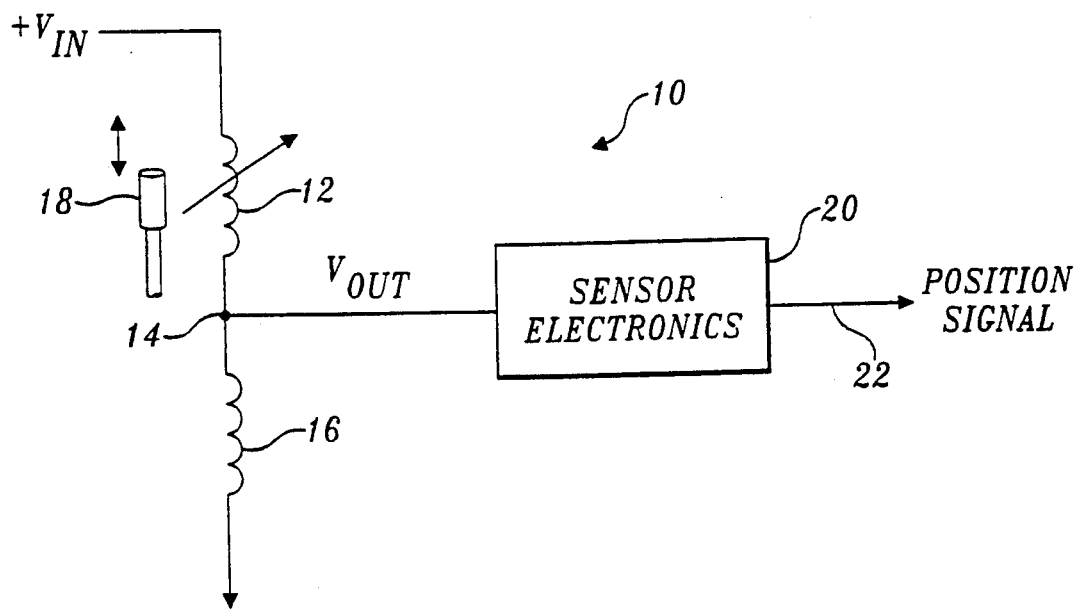
FIG. 1 is a schematic diagram of an inductive divider sensor according to the present invention.

FIG. 1 is a simplified electrical schematic diagram of the inductive divider sensor 10 according to the present invention. As will be discussed in further detail below, the inductive divider sensor produces an output signal that varies linearly with the position of an object whose position is to be sensed.

The inductive divider sensor 10 comprises a variable inductor 12 connected in series with a fixed inductor 16. The variable inductor 12 is connected between a source of driving voltage, $V_{in}$, and a node 14, while the fixed inductor 16 is connected between the node 14 and a reference potential such as a ground. A target element 18 made of a highly magnetically permeable material is coupled to an object (not shown) whose position is to be sensed. The target element 18 is moved by the object along an axis that extends through the center of the variable inductor 12. As the target element is moved within the variable inductor, it causes a change in the impedance of the variable inductor 12, thereby increasing or decreasing the magnitude of an output voltage, $V_{out}$, at the node 14. The output voltage at node 14 is measured by a sensing electronics circuit 20. The sensor electronics circuit 20 transmits an analog or digital position signal on a wire or fiber optic cable 22 to a remote location, such as an aircraft flight control system. The position signal transmitted from the sensor electronics circuit is indicative of the position of the object. The details of the sensor electronics circuit 20 are well known to those skilled in the art of sensor design and therefore need not be discussed further.

The inductive divider sensor 10 operates as a voltage divider circuit that produces an output voltage signal that is proportional to the relative impedance of the two inductors 12 and 16. The output signal is given by the following equation:

$$V_{out} = \frac{V_{in} Z_2}{Z_1 + Z_2} \quad (1)$$

where $Z_1$ is the impedance of the variable inductor 12, $Z_2$ is the impedance of the fixed inductor 16 and $V_{in}$ is the magnitude of the driving voltage.

In most position sensing applications, it is desirable that the position signal of a sensor vary linearly with the position of the object being sensed. Because most modern control systems are operated by digital computers, linearly varying position signals are preferred because they are easier to convert from an analog format to a digital format that can be manipulated by a computer. However, if a typical single coil variable inductor is used for the variable inductor 12, the output voltage given by Equation 1 will not vary linearly with the position of the target element. A typical single coil variable inductor has an impedance that varies linearly with the position of the target element. For example, a typical variable inductor may have an impedance, Z, that varies according to the linear equation $Z = Cx + D$ where C is the slope of the change in impedance, x is the position of the target element within the variable inductor, and D is the residual impedance of the coil when the target element is outside of the variable inductor. If such an inductor is used in the inductive divider sensor 10, the output voltage, $V_{out}$, given by Equation 1 will not vary linearly with the position of the object. Assuming the fixed inductor 16 has an impedance E, Equation 1 has the form:

$$V_{out} = \frac{V_{in} E}{Cx + D + E} \quad (2)$$

As can be seen, Equation 2 is not linear with respect to the target position x. To solve this problem, the variable inductor 12 of the present invention is designed so that as the target element moves, the impedance of the inductor 12 changes such that the output voltage, $V_{out}$, of the sensor taken at the node 14 varies linearly with the position of the object.

For example, assume that it is desired to have the output voltage of the sensor 10 vary according to a desired linear function f of the position of the target element x. Thus, $V_{out} = f(x)$. By substituting $V_{out} = f(x)$ and solving Equation 1 for the term $Z_1$, the following equation is developed:

$$Z_1 = Z_2 \left( \frac{V_{in}}{f(x)} - 1 \right) \quad (3)$$

If the impedance $Z_1$ of the variable inductor 12 can be made to vary according to Equation 3, then as the position x of the target element within the variable inductor 12 changes, the output voltage, $V_{out}$, of the sensor will vary according to the desired output function f(x). Although the function f(x) is preferably linear for position sensors, it could be virtually any function.

Figure 2:
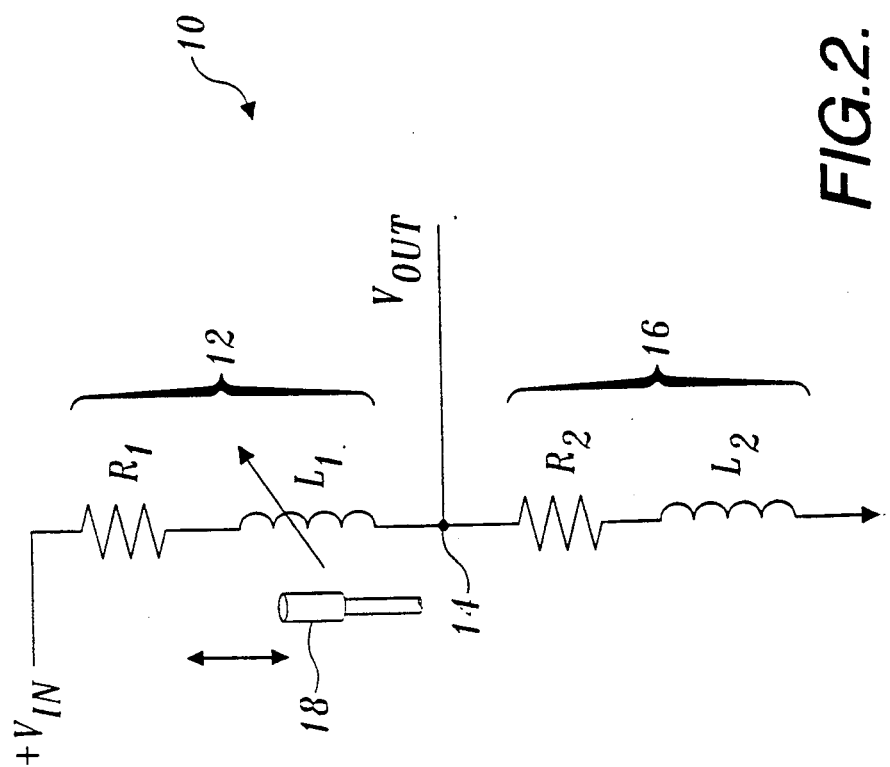
FIG. 2 is a more detailed electrical schematic diagram of the inductive divider sensor shown in FIG. 1.

Equation 3 defines how the impedance $Z_1$ of the variable inductor 12 should vary so the output voltage, $V_{out}$, will vary according to a desired output function f(x). In actuality, the impedances of the inductors 12 and 16 that comprise the inductive divider sensor 10 include a resistance as well as an inductance. FIG. 2 is a more detailed electrical schematic diagram of the inductive divider sensor shown in FIG. 1. The inductive divider 10 comprises a variable inductor 12, which can be represented as a resistance $R_1$ and a variable inductance $L_1$, connected in series with the fixed inductor 16, which can be represented as a resistance $R_2$ and fixed inductance $L_2$. A more detailed description of the output voltage, $V_{out}$, taken at the node 14 where the fixed inductor 16 is connected to the variable inductor 12 is given by the following equation:

$$V_{out} = \frac{V_{in}(R_2 + j\omega L_2)}{R_1 + R_2 + j\omega(L_1 + L_2)} \quad (4)$$

where $V_{in}$ is the magnitude of the driving voltage and $\omega$ is the angular frequency of the driving voltage. If it is desired that the output voltage, $V_{out}$, of the sensor vary linearly according to a linear function such as $V_{out} = Ax + b$, where A is the slope of the output voltage and b is the voltage of the sensor when the target element is at the end of stroke position, then by substituting $Ax + b$ for $V_{out}$, it can be shown that the magnitude (ignoring the phase component) of the output voltage, $V_{out}$, is given by the equation:

$$Ax + b = \frac{V_{in}\sqrt{R_2^2 + \omega^2 L_2^2}}{\sqrt{(R_1 + R_2)^2 + \omega^2(L_1 + L_2)^2}} \quad (5)$$

The output voltage of the sensor 10 can be made to vary according to the desired linear function $Ax+b$, if the impedance of the variable inductor 12 is designed correctly.

Solving Equation 5 for the variable inductance $L_1$ results in the equation:

$$L_1 = \frac{1}{\omega}\sqrt{\frac{V_{in}^2(R_2^2 + \omega^2 L_2^2)}{(Ax + b)^2} - (R_1 + R_2)^2} - L_2 \quad (6)$$

If the inductance of the variable inductor $L_1$ is designed to vary according to Equation 6 as the target element 18 is moved to a position x within the variable inductor, then the output voltage of the sensor 10 will vary according to the desired linear output function $V_{out} = Ax+b$.

Figure 3A:
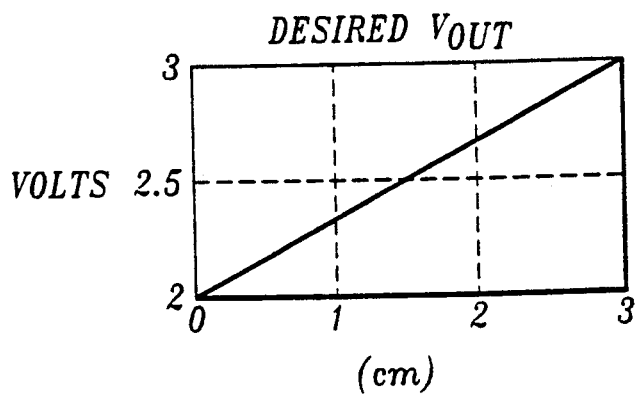
FIGS. 3A-3D show a series of graphs associated with the inductive divider sensor shown in FIG. 2.
Figure 3B:
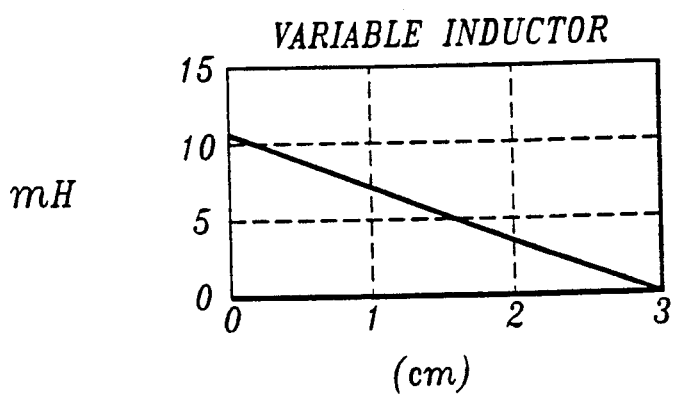
Figure 3C:
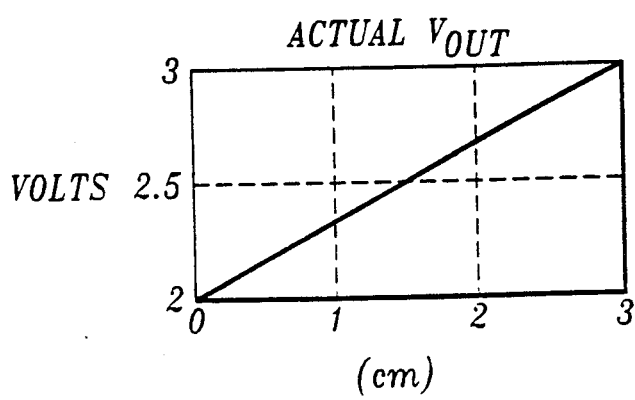
Figure 3D:
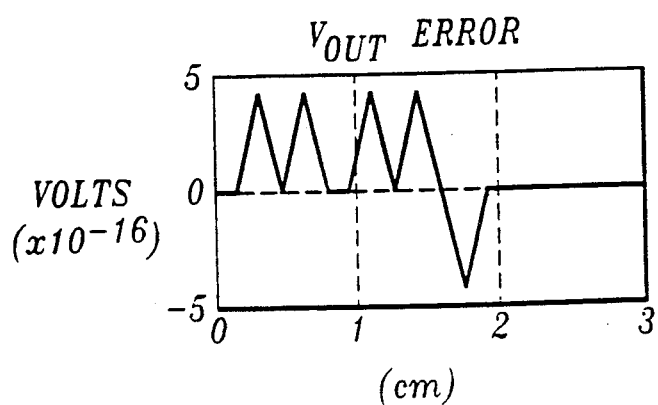

FIGS. 3A-3D show a series of graphs that plot the output voltage, $V_{out}$, of the inductive divider sensor shown in FIGS. 1 and 2 versus the position x of the target element. A graph of a desired linear output function versus target position is shown in FIG. 3A. The particular output function selected is often dictated by the particular control system in which the sensor is to be used. As can be seen, the predetermined output voltage varies from 2-3 volts as the target element is moved from 0 to 3 cm within the variable inductor 12. To achieve this, the variable inductor 12 is designed to have an inductance $L_1$ that varies nonlinearly according to Equation 6, which is shown plotted in FIG. 3B. If the variable inductor 12 is so constructed, the output voltage of the sensor will vary as shown in FIG. 3C. On the scale used in FIG. 3C the output voltage of the sensor appears identical to the desired output function shown in FIG. 3A. Only when the scale is amplified greatly as in FIG. 3D does the error between the actual output voltage of the sensor and the desired output voltage appear. As can be seen, however, the error is virtually zero (i.e., ess $5 \times 10^{-16}$ volts) for the entire stroke of the target element. The results shown in FIG. 3 were made with the following parameters:

TABLE 1

Figure 4:
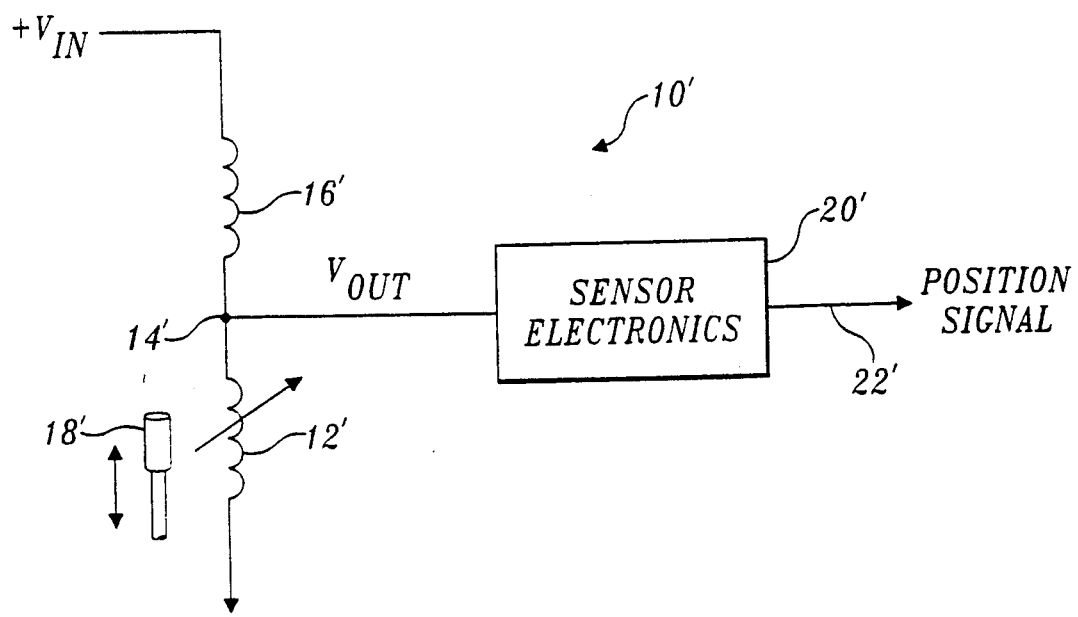
FIG. 4 is a schematic diagram of an alternate embodiment of the inductive divider sensor according to the present invention.

$V_{in} = 5$ volts
$\omega = 2\pi \cdot 2000$ Hz
$V_{out}(max) = 3$ volts
$V_{out}(min) = 2$ volts
Stroke = 3 cm
$R_1 = 75$ ohms
$R_2 = 75$ ohms
$L_2 = 0.005$ henries FIG. 4 shows an alternate embodiment of the inductive divider sensor according to the present invention. Each element within the second embodiment is similar to the corresponding element shown in FIG. 1, except that the position of the variable inductor element has been moved. Therefore, each element in the alternate embodiment is shown with a prime to distinguish it from FIG. 1.

In the second embodiment, the inductive divider sensor 10' comprises a variable inductor 12' and a fixed inductor 16'. The fixed inductor 16' is connected between a source of a driving voltage $V_{in}$ and a node 14', while the variable inductor 12' is connected between the node 14' and ground. A target element 18' is coupled to the object whose position is to be sensed. As the target element 18' changes position within the variable inductor 12', the impedance of the variable inductor 12' changes, thereby producing a signal, $V_{out}$, at the node 14' that is indicative of the position of the object. As will be appreciated by those skilled in the art and in view of the earlier discussion, the signal, $V_{out}$, taken at the node 14' depends on the relative impedance of the variable inductor 12' compared to the impedance of the fixed inductor 16'. The output voltage at the node 14' is given by the equation:

$$V_{out} = \frac{V_{in} Z_1'}{Z_1' + Z_2'} \quad (7)$$

where $Z_1'$ is the impedance of the variable inductor 12', $Z_2'$ is the impedance of the fixed inductor 16' and $V_{in}$ is the magnitude of the driving voltage.

As will be appreciated from the discussion of Equation 1, if a standard linear variable inductor were used for the inductor $L_1'$, the output signal, $V_{out}$, given by Equation 7 will not be linear. However, the variable inductor 12' can be designed to have an impedance that varies nonlinearly such that the resulting output voltage, $V_{out}$, is linear. Again, assume for example that it is desired that the output voltage, $V_{out}$, varies according to the function $V_{out} = f(x)$ as described above. Then the variable inductor 12' should be constructed to have an impedance that varies according to the following function:

$$Z_1' = \frac{Z_2'}{\frac{V_{in}}{f(x)} - 1} \quad (8)$$

If the impedance of the variable inductor 12' varies according to Equation 8 as the target element is moved to a position x within the variable inductor 12', then the output voltage, $V_{out}$, will vary according to the desired output function $V_{out} = f(x)$.

Figure 5:
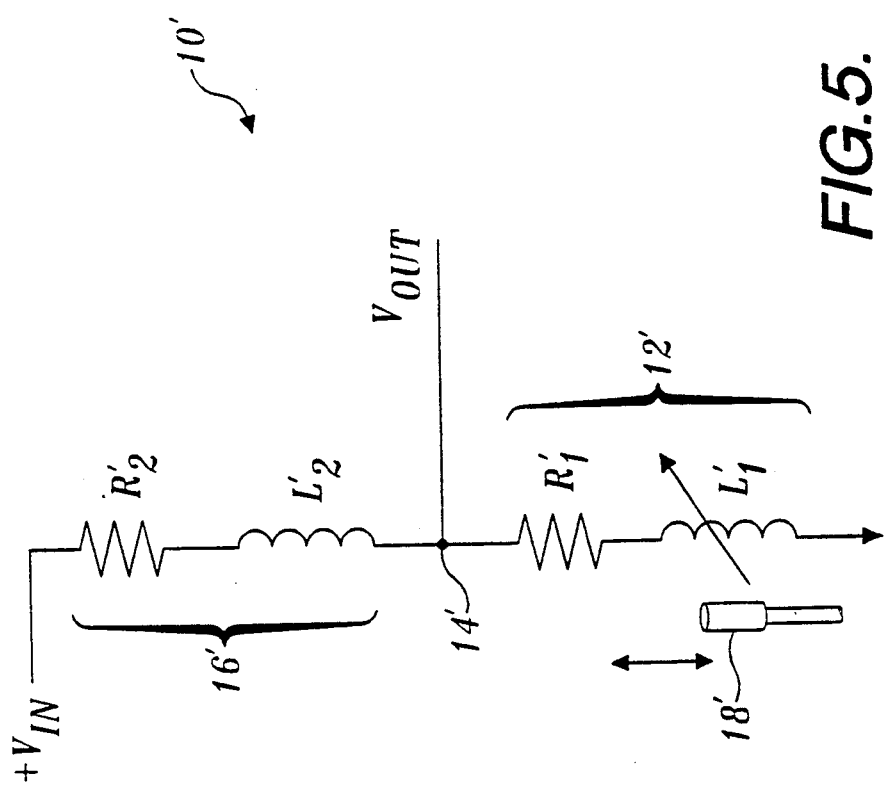
FIG. 5 is a more detailed electrical schematic diagram of the inductive divider sensor shown in FIG. 4.

FIG. 5 is a more detailed electrical schematic diagram of the sensor configuration shown in FIG. 4. The inductive divider sensor 10' comprises the fixed inductor 16' that can be represented as having a resistance $R_2'$ and a fixed inductance $L_2'$ connected in series with the variable inductor 12' that can be represented as a resistance $R_1'$ and a variable inductance $L_1'$. The output voltage, $V_{out}$, of sensor 10' taken at the node 14' is given by the following equation:

$$V_{out} = \frac{V_{in}(R_1' + j\omega L_1')}{R_1' + R_2' + j\omega(L_1' + L_2')} \quad (9)$$

where $\omega$ is the angular frequency of the driving voltage and $V_{in}$ is the magnitude of the driving voltage. If it is desired that the output voltage of the sensor 10' vary according to a predefined linear function such as $V_{out} = Ax+b$, the magnitude of output voltage of the sensor at the node 14' is given by the following equation:

$$Ax + b = \frac{V_{in}\sqrt{R_1'^2 + \omega^2 L_1'^2}}{\sqrt{(R_1' + R_2')^2 + \omega^2(L_1' + L_2')^2}} \quad (10)$$

Again, one way of making the output voltage of the sensor 10' follow the predefined output function is by carefully designing the way in which the inductance of the variable inductor 12' changes with the position of the target element.

Equation 10 can be solved in terms of $L_1'$ such that for each target position x within the variable inductor 12', the output voltage varies according to the desired output function $V_{out} = Ax + b$. Rearranging Equation 10, in terms of $L_1'$, produces the following quadratic equation:

$$L_1'^2[(Ax+b)^2\omega^2 - V_{in}^2\omega^2] + L_1'(Ax+b)^2 2L_2' + \\ (Ax+b)^2(R_1'+R_2')^2 + (Ax+b)^2\omega^2 L_2'^2 - V_{in}^2 R_1'^2 = 0 \quad (11)$$

Whether Equation 11 can be solved for real values of $L_1'$, such that the output voltage, $V_{out}$, equals the desired output function $Ax+b$ at each point x, depends upon the specific terms of the equation. For example, for some desired output functions, no real solutions to Equation 11 may exist. If a solution exists and the variable inductor 12' is constructed to have an inductance that varies according to the solution, then the output voltage of the sensor will vary according to the predetermined output function $V_{out} = Ax + b$.

Figure 6A:
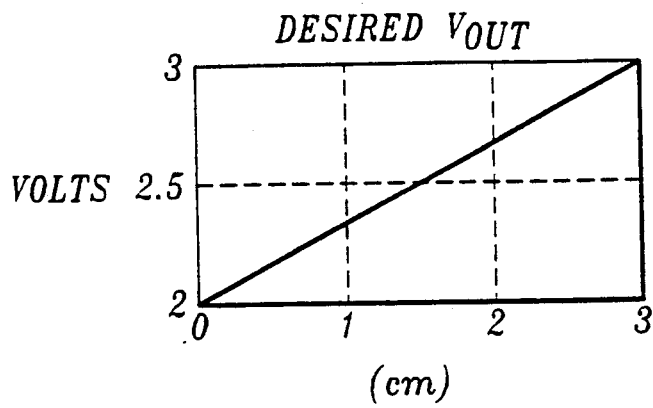
FIGS. 6A–6D are a series of graphs that are associated with the alternate configuration of the inductive divider sensor shown in FIG. 5.
Figure 6B:
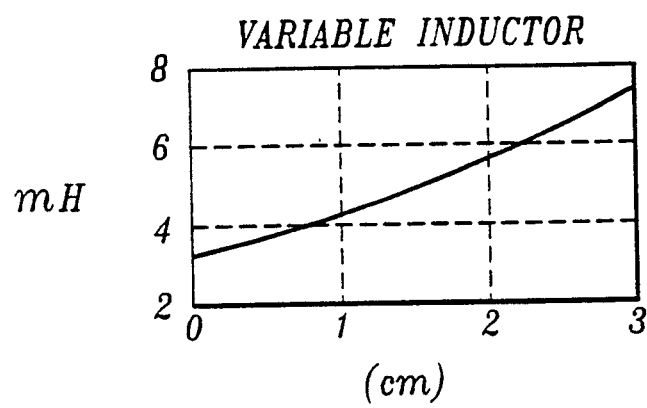
Figure 6C:
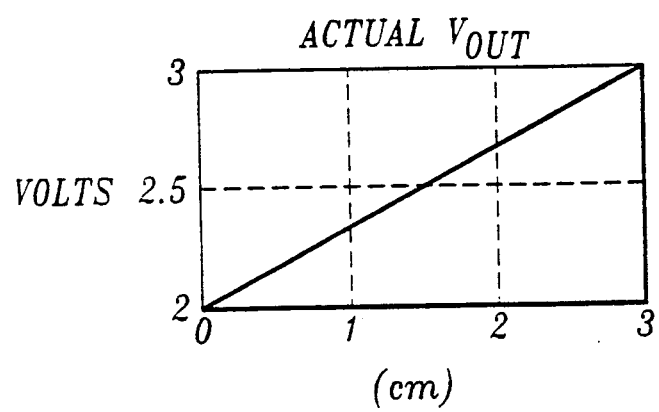
Figure 6D:
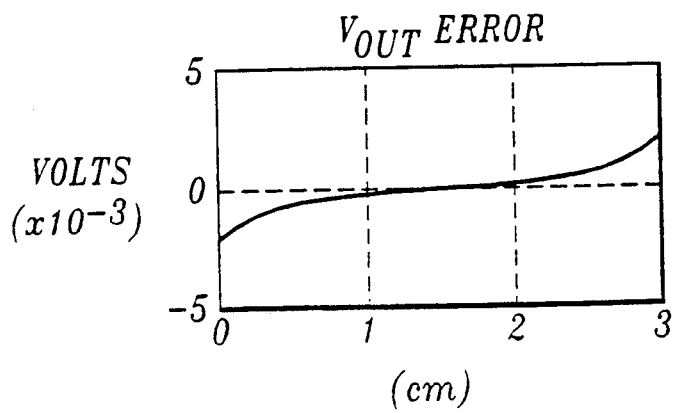

FIGS. 6A-6D show how an inductive divider sensor 10' can be constructed to produce a desired linear output voltage. FIG. 6A shows the desired linear output voltage function, which varies from 2-3 volts as the target element is moved from 0-3 cm within the variable inductor 12'. FIG. 6B is a graph of a nonlinear solution to Equation 11 given the desired output function shown in FIG. 6A. If the variable inductor 12' is made to have an inductance that varies as shown in FIG. 6B, then for each target position x the output voltage, $V_{out}$, of the sensor taken at the node 14' will vary linearly as is shown in FIG. 6C. Using the scale of FIG. 6C, it can be seen the output voltage, $V_{out}$, of the sensor closely approximates the desired output function shown in FIG. 6A. Only when the scale is amplified greatly as in FIG. 6D does the error or difference between the actual output voltage and the desired output voltage appear. The error between the actual output voltage and the desired output voltage is minimal between 1 and 2 cm but approaches $2 \times 10^{-3}$ volts at the beginning and end of the target element stroke. This error, while small, may be too great for some precision position sensing applications. The graphs shown in FIGS. 6A-6D were calculated for an inductive sensor assuming:

TABLE 2

$V_{in} = 5$ volts
$\omega = 2\pi \cdot 2000$ Hz
$V_{out}(\max) = 3$ volts
$V_{out}(\min) = 2$ volts
stroke = 3 cm
$R_1' = 10$ ohms
$R_2' = 10$ ohms
$L_2' = 0.005$ henries An alternate way of designing the sensor configuration shown in FIGS. 4 and 5 to produce a linear output signal is by using the same technique used to design the sensor configuration shown in FIGS. 1 and 2. This technique involves solving the sensor of FIG. 1 for the voltage across the variable inductor 12 instead of the fixed inductor 16. This voltage will typically vary in a nonlinear fashion. The nonlinear voltage is then substituted for the desired linear function $Ax+b$ and the sensor is solved again using Equation 6 so that the voltage across the fixed inductor varies according to the nonlinear function as the target element is moved. If the voltage across the fixed inductor varies nonlinearly, then the voltage across the variable will be linear, which is the result desired for the sensor configuration shown in FIG. 4. Therefore, the solution to the sensor configuration shown in FIG. 1 where the voltage varies nonlinearly across the fixed inductor 16 can be used for the sensor shown in FIG. 4 with the position of the fixed and variable inductors interchanged.

To illustrate this method of designing the sensor shown in FIG. 4, assume the sensor configuration of FIGS. 1 and 2 is designed to produce the desired linear output voltage $V_{out} = Ax + b$. Then the sensor 10 shown in FIG. 2 is solved for the voltage across the variable inductor 12, as opposed to the voltage across the fixed inductor 16. As described above, voltage across the variable inductor will typically be a nonlinear function. This nonlinear function can then be substituted for the predefined linear function $Ax+b$ in Equation 6. Solving Equation 6 given the new desired nonlinear function results in a sensor design in which the voltage across the fixed inductor 16 is nonlinear but the voltage across the variable inductor 12 varies according to the desired linear function $V_{out} = Ax + b$. This is exactly the response desired for the sensor configuration shown in FIGS. 4 and 5. The position of the variable inductor and the fixed inductor can then be interchanged to produce the sensor configuration shown in FIG. 4.

As can be seen from the above graphs shown in FIGS. 3A-3D and FIGS. 6A-6D, the inductive divider sensor shown in FIG. 1 can be made more accurate than the inductive divider sensor shown in FIG. 4. Therefore, it is preferred to use the arrangement of FIG. 1 in which the output voltage of the sensor is measured across the fixed inductor 16 rather than across the variable inductor 12'.

To design an inductor having an inductance that varies according to some predetermined function such as that given by Equations 6 and 11 involves winding a number of coils (each having a number of turns N) at different positions along a nonmagnetic bobbin. The coils are connected in series so that the inductance of the entire inductor is due to the sum of each individual coil's inductance. By carefully selecting the number of turns N that each coil contains, the total inductance of the coil can be made to vary according to a desired predefined inductance function. The details of how to design and fabricate a variable inductor having an inductance that varies according to a desired predefined inductance function are fully set forth in commonly assigned, copending U.S. patent application Ser. No. 07/892,164 filed Jun. 2, 1992, the specification of which is herein incorporated by reference.

As can be seen, what has been disclosed is a simple inductive divider position sensor that produces an output signal that varies linearly with the position of a target element. The fixed inductor 16 or 16' is not required to be placed physically next to the variable inductor, but need only be exposed to the same environmental conditions so that the impedance of the fixed and variable inductors will change similarly with changes in temperature. Because the fixed inductor need not be placed near the variable inductor, it is possible to wind the fixed inductor on a small bobbin, thereby decreasing the size of the overall position sensor yet still providing temperature compensation. Thus, the inductive divider sensor according to the present invention provides an accurate linear output voltage, requires only simple interfacing electronics, and can be made lighter and smaller than prior art inductive sensor designs.

Although the present invention has been described with respect to its preferred embodiments, those skilled in the art will realize that changes can be made in the formal function without departing from the spirit of the invention. For example, Equations 6 and 11 are derived assuming a constant frequency sinusoidal AC signal. However, similar equations could be developed for triangular waveforms, pulse waveforms, etc. This would be accomplished in the same way by solving for the output of the sensor given the particular driving function and solving for the variable inductance $L_1$ or $L_1'$ in terms of the predetermined output function $f(x)$. Additionally, the same technique of designing the inductance of the variable inductor to vary as a function of the desired output voltage can be used to create output voltages that vary in a nonlinear fashion as well as a linear fashion. This is accomplished by substituting the desired nonlinear equation into the appropriate Equation 6 and 11 described above. Therefore, it is intended that the scope of the invention be determined solely from the following claims.

The embodiments of the invention in which an exclusive property or privilege is claimed are defined as follows:

1. An inductive position sensor that, when coupled to a source of driving voltage, produces an output signal that is related to a position of an object in accordance with a predetermined mathematical formula comprising:
   a first inductor having a fixed impedance;
   a variable inductor connected in series with the first inductor, the unconnected end of one of the first and variable inductors suitable for being coupled to a source of driving voltage; and
   a target element including means for coupling the target element to the object whose position is to be indicated, the target element being movable along an axis that extends into the variable inductor, wherein the variable inductor includes a number of serially connected coils, each coil having a number of windings, N, that are wound such that the variable inductor has an impedance that varies with the position of the target element so that the ratio of the fixed impedance and the variable impedance divides the driving voltage to produce an output signal that varies according to a predetermined mathematical formula, said output signal being produced at a node that joins the first inductor and the variable inductor.

2. The inductive position sensor of claim 1, wherein the variable inductor is coupled between the source of the driving voltage and the first inductor, and wherein the impedance of the variable inductor varies according to the equation:

$$Z_1 = Z_2 \left( \frac{V_{in}}{f(x)} - 1 \right)$$

where $Z_1$ is an impedance of the variable inductor, $Z_2$ is an impedance of the first inductor, $f(x)$ is the predetermined mathematical formula that describes the output signal of the inductive sensor taken at the node that joins the first inductor and the variable inductor, and $V_{in}$ is the magnitude of the driving voltage.

3. The inductive position sensor of claim 1, wherein the variable inductor is coupled between the source of the driving voltage and the first inductor, and wherein the impedance of the variable inductor comprises an inherent resistance $R_1$ and a variable inductance $L_1$ that varies according to the equation:

$$L_1 = \frac{1}{\omega} \sqrt{\frac{V_{in}^2(R_2^2 + \omega^2 L_2^2)}{(Ax+b)^2} - (R_1 + R_2)^2} - L_2$$

where $L_2$ is an inductance of the first inductor, $R_2$ is an inherent resistance of the first inductor, $Ax+b$ is a predetermined linear mathematical formula that describes the output signal of the sensor, $\omega$ is the frequency of the driving voltage and $V_{in}$ is the magnitude of the driving voltage.

4. The inductive position sensor of claim 1, wherein the first inductor is coupled between the source of the driving voltage and the variable inductor, and wherein the impedance of the variable inductor varies according to the equation:

$$Z_1 = \frac{Z_2}{\frac{V_{in}}{f(x)} - 1}$$

where $Z_1$ is the impedance of the variable inductor, $Z_2$ is the impedance of the first inductor, $f(x)$ is the predetermined mathematical formula that describes the output signal of the inductive sensor taken at the node that joins the first inductor to the variable inductor and $V_{in}$ is the magnitude of the driving voltage.

5. The inductive position sensor of claim 1, wherein the first inductor is coupled between the source of the driving voltage and the variable inductor, and wherein the impedance of the variable inductor comprises an inherent resistance $R_1$ and a variable inductance $L_1$ that varies according to a solution of an equation:

$$L_1^2[(Ax+b)^2\omega^2 - V_{in}^2\omega^2] + L_1(Ax+b)^2\omega^2 2L_2 + (Ax+b)^2(R_1+R_2)^2 + (Ax+b)^2\omega^2 L_2^2 - V_{in}^2 R_1^2 = 0$$

where $L_2$ is the inductance of the first inductor, $R_2$ is an inherent resistance of the first inductor, $Ax+b$ is a predetermined linear mathematical formula that describes the output signal of the sensor, $\omega$ is the frequency of the driving voltage and $V_{in}$ is the magnitude of the driving voltage signal.

6. The inductive position sensor of claim 1, wherein the output signal is linear.

7. The inductive position sensor of claim 1, wherein the driving voltage comprises a constant frequency AC signal.

8. The inductive divider sensor as in claim 1, wherein the output signal is linear.

9. The inductive sensor as in claim 1, wherein the first inductor and the variable inductor have an impedance that varies in substantially the same way when exposed to a varying temperature.

10. The inductive sensor as in claim 1, wherein the output signal is nonlinear.

11. An inductive sensor for producing an output signal that is indicative of a position of an object in accordance with a predetermined mathematical formula, comprising:
a source of a driving voltage;
a first inductor having a fixed inductance;
a variable inductor connected in series with the first inductor; and
a target element including means for coupling the target element to the object whose position is to be indicated, wherein the target element is movable along an axis that extends through the variable inductor by the object, wherein the first inductor and the variable inductor are connected in series between the source of the driving voltage and a ground potential and wherein the variable inductor comprises a plurality of coils each having a number of turns, N, wherein the number of turns, N, is selected so that the variable inductor has an impedance that varies as the target element is moved such that the ratio of the fixed impedance and the impedance of the variable inductor produces an output signal at a node that joins the first and variable inductors that varies according to a predetermined mathematical formula.

12. A method for determining the position of an object with an inductive divider sensor that produces an output signal that varies according to a predetermined mathematical formula, the method comprising the steps of:
coupling a target element to the object whose position is to be sensed so that as the object moves, the position of the target element is moved along an axis that extends into the inductive divider sensor, wherein the inductive divider sensor comprises:
a first inductor having a fixed impedance;
a variable inductor connected in series with the first inductor, the variable inductor including a plurality of serially connected coils, each having a number of windings, N, that are selected such that the variable inductor has an impedance that varies with the position of the target element, the impedance of the variable inductor is selected such that the ratio of the fixed impedance and the variable impedance produces an output voltage at a node where the first and the variable inductors are connected that varies according to a predetermined mathematical formula;
sensing the output voltage; and
using the output voltage in the predetermined mathematical formula to determine the position of the object.

13. The method of claim 12, wherein the predetermined mathematical formula is linear.

14. The method of claim 12, wherein the inductive divider sensor further comprises a source of a driving voltage.

15. The method of claim 14, wherein the first inductor is disposed between the variable inductor and the source of the driving voltage.

16. The method of claim 14, wherein the variable inductor is disposed between the source of the driving voltage and the first inductor.

* * * * *

UNITED STATES PATENT AND TRADEMARK OFFICE
CERTIFICATE OF CORRECTION

PATENT NO. : 5,331,277
DATED : July 19, 1994
INVENTOR(S) : B.J. Burreson

It is certified that error appears in the above-indentified patent and that said Letters Patent is hereby corrected as shown below:.

| COLUMN | LINE | |
|---|---|---|
| 7 | 3 | "$R_1'^2 + \omega^2 L_1'^2$" should read --$R'_1{}^2 + \omega^2 L'_1{}^2$-- |
| 7 | 4 | "$(R_1' + R_2')^2 + \omega^2(L_1' + L_2')^2$" should read --$(R'_1 + R'_2)^2 + \omega^2(L'_1 + L'_2)^2$-- |

Signed and Sealed this

Eighth Day of November, 1994

Attest:

BRUCE LEHMAN

Attesting Officer      Commissioner of Patents and Trademarks